United States Patent
Herold et al.

(10) Patent No.: US 11,975,441 B2
(45) Date of Patent: May 7, 2024

(54) GRIPPER DEVICE FOR AN OBJECT, CHARGING ROBOT HAVING A GRIPPER DEVICE

(71) Applicant: VOLKSWAGEN AKTIENGESELLSCHAFT, Wolfsburg (DE)

(72) Inventors: Stephan Herold, Braunschweig (DE); Daniel Schütz, Lehre/Essenrode (DE); Kristin Fondahl, Braunschweig (DE); Annika Raatz, Hemmingen (DE); Serhat Ibrahim, Hannover (DE); Julius Ibenthal, Lehrte (DE); Felix Bartling, Isernhagen (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 367 days.

(21) Appl. No.: 16/977,114

(22) PCT Filed: Feb. 27, 2019

(86) PCT No.: PCT/EP2019/054804
§ 371 (c)(1),
(2) Date: Sep. 1, 2020

(87) PCT Pub. No.: WO2019/166464
PCT Pub. Date: Sep. 6, 2019

(65) Prior Publication Data
US 2020/0406470 A1    Dec. 31, 2020

(30) Foreign Application Priority Data

Mar. 1, 2018   (DE) .................. 10 2018 104 670.7

(51) Int. Cl.
*B25J 11/00*    (2006.01)
*B25J 15/00*    (2006.01)
(Continued)

(52) U.S. Cl.
CPC ......... *B25J 11/008* (2013.01); *B25J 15/0033* (2013.01); *B60L 53/16* (2019.02); *B60L 53/35* (2019.02)

(58) Field of Classification Search
CPC ...... B25J 11/008; B25J 15/0033; B60L 53/16; B60L 53/35; B60L 53/1835
See application file for complete search history.

(56) References Cited

U.S. PATENT DOCUMENTS

| | | |
|---|---|---|
| 6,230,367 B1 | 5/2001 | Riedl |
| 9,233,618 B2 | 1/2016 | Dyer et al. |
| 2012/0043935 A1* | 2/2012 | Dyer .................... B60L 3/0046 320/109 |

FOREIGN PATENT DOCUMENTS

| | | |
|---|---|---|
| CN | 1903515 A | 1/2007 |
| CN | 101318325 A | 12/2008 |

(Continued)

OTHER PUBLICATIONS

Car TV; Volkswagen E-smart Connect; YouTube; Jul. 14, 2015; downloaded from https://www.youtube.com/watch?v=-9VulKSy5uw. (hereinafter Volkswagen). (Year: 2022).*
(Continued)

*Primary Examiner* — David V Henze-Gongola
(74) *Attorney, Agent, or Firm* — Barnes & Thornburg LLP (57) ABSTRACT

A gripper device for an object and a changing robot having such a gripper device. The gripper device includes a housing having an inner contour that is a negative contour adapted at least partly to the contour of an object. Also disclosed is a charge plug for a transportation vehicle.

20 Claims, 13 Drawing Sheets

(51) Int. Cl.
    *B60L 53/16*     (2019.01)
    *B60L 53/35*     (2019.01)

(56) References Cited

FOREIGN PATENT DOCUMENTS

| | | |
|---|---|---|
| CN | 103786160 A | 5/2014 |
| CN | 103843220 A | 6/2014 |
| CN | 104816169 A | 8/2015 |
| CN | 106848718 A | 6/2017 |
| CN | 107097678 A | 8/2017 |
| CN | 206595464 U | 10/2017 |
| CN | 206947643 U | 1/2018 |
| DE | 3930981 A1 | 3/1991 |
| DE | 102006009432 A1 | 9/2007 |
| EP | 2636638 A1 | 9/2013 |
| JP | 2016046983 A | 4/2016 |
| WO | 2017119982 A1 | 7/2017 |

OTHER PUBLICATIONS

Car TV; Volkswagen E-smart Connect; YouTube; Jul. 14, 2015; downloaded from https://www.youtube.com/watch?v=-9VulK/Sy5uw.

Springerlink; Automated robot-based charging system for electric vehicles; Apr. 28, 2016; downloaded from https://link.springer.com/chapter/10.1007/978-3-65.

Search Report for International Patent Application No. PCT/EP2019/054804; dated May 23, 2019.

Office Action; Chinese Patent Application No. 201980015006.7; dated Dec. 9, 2022.

Office Action; Chinese Patent Application No. 201980015006.7; Sep. 20, 2023.

Office Action; Chinese Patent Application No. 201980015006.7; Dec. 18, 2023.

\* cited by examiner

GRIPPER DEVICE FOR AN OBJECT, CHARGING ROBOT HAVING A GRIPPER DEVICE

PRIORITY CLAIM

This patent application is a U.S. National Phase of International Patent Application No. PCT/EP2019/054804, filed 27 Feb. 2019, which claims priority to German Patent Application No. 10 2018 104 670.7, filed 1 Mar. 2018, the disclosures of which are incorporated herein by reference in their entireties.

SUMMARY

Illustrative embodiments relate to a gripper device for an object, in particular, to a gripper device for a charger plug for a transportation vehicle. Illustrative embodiments furthermore relate to a charging robot having such a gripper device.

BRIEF DESCRIPTION OF THE DRAWINGS

Further features of the disclosed embodiments will become evident from the description hereunder and the appended claims in conjunction with the figures in which:

DETAILED DESCRIPTION

The automated plugging-in of AC and DC charger cables by a robot is a highly promising concept for enhancing automated parking functions of transportation vehicles and for increasing the utilization of the capacity of charging stations for transportation vehicles. For automated plugging-in, the AC or DC cable has to be gripped by the robot on the handle of the cable by way of a gripper which is specially adapted to the handle.

Against this background, EP 2 636 638 B1 describes a supporting arm for a charger plug for a transportation vehicle. The supporting arm is composed of two arm portions which are in each case formed by one parallelogram linkage. The arm portions are connected to one another by a mounting. An L-shaped suspension for the charger plug is fastened to the end of the one arm portion by a mounting. The suspension comprises two yoke portions, the charger plug being incorporated therebetween. The yoke portions have in each case one bore into which a stud for fastening the charger plug is pushed. The suspension can moreover have a locking device for the charger plug.

Gripping the plug in the case of current systems usually takes place by way of a classic two-finger gripper having a finger contour that is specially adapted to the type of plug. A special active gripper tool in which the gripping movement is controlled by an additional actuator thus has to be developed for each type of plug. Moreover, depending on the region of use, specific plugs require additional locking and unlocking of the plug by way of a push button. Automation herein means additional complexity in terms of the gripper or in terms of the transportation vehicle.

Disclosed embodiments provide a gripper device for an object in which various objects can be gripped by only one tool.

According to the disclosed embodiments, a gripper device for an object has a housing having an internal contour, wherein the internal contour is a negative contour and is adapted to at least part of a contour of the object. The object can be a charger plug for a transportation vehicle, for example.

The solution described utilizes the approach that an internal contour of a housing of the gripper device is adapted to the contour of the object to be gripped. The internal contour thus represents a negative contour of the object contour. A wide range of objects can be gripped in this way, provided that the objects at least in part have a common contour. This is the case with charger plugs for transportation vehicles since the vendors of charger plugs typically utilize a uniform design of the various types of charger plugs for reasons of an economical production or else with a view to a recognition factor. All charger plugs of one vendor can thus usually be received using only a single, completely installed gripper device. To be adapted to the charger plugs of various vendors, the gripper device may be embodied in a modular and adjustable manner, for example, by way of an interchangeable housing.

According to at least one disclosed embodiment, the internal contour of the housing is adapted to a contour of a handle region of the charger plug. The electrical contacts and thus the plug region of the charger plugs often differ depending on the region of use and on whether charging takes place by AC or DC. Owing to the system, the plug region can therefore not always be embodied so as to have a uniform contour. In contrast, the handle region can be designed so as to be largely independent of the remaining design of the charger plug such that a uniform contour can typically be found in this region.

According to at least one disclosed embodiment, the gripper device has a locking mechanism which fixes the charger plug in the housing. The reliability in pairing the charger plug and the gripper device can be enhanced by the locking mechanism, since any inadvertent release of the charger plug from the gripper device is prevented. Forces which in the absence of a locking mechanism can lead to such an inadvertent release arise when plugging the charger plug into a charging socket of the transportation vehicle, or when removing the charger plug from the charging socket.

According to at least one disclosed embodiment, the locking mechanism engages in a handle recess of the charger plug. The handle region by virtue of the handle recess has an internal radiused feature which can be utilized for the locking mechanism. To this end, a locking bar of the locking mechanism in the locked state engages in the handle recess, and presses against the internal radiused feature of the handle region. The pressing action can be generated by way of a spring which pushes the locking bar into the housing. The locking bar can rotate about an axis and folds outward when opening. To be able to release the charger plug, the latter has to be tilted out of the gripper device. To this end, the retaining force of the locking bar has to be overcome.

According to at least one disclosed embodiment, the locking mechanism has an adjustable stud which is able to be introduced into a cavity of the handle region. For saving material and weight, many charger plugs have a hollow handle. This fact can be utilized for an active locking mechanism in which the charger plug can be released and connected without any effort in terms of force. The fixed pairing is achieved by a stud which moves into the cavity of the handle. Only very minor forces are required for moving the stud, since the retaining forces are not generated by the actuating elements but on account of the structure and mounting are directed directly into the housing. The actuating elements can thus be switched off in the secured state, i.e., when the stud has moved into the cavity.

According to at least one disclosed embodiment, the gripper device has an unlocking mechanism for a securing element of the charger plug. Some of the current charger plugs have a securing element which has to be unlocked by activating an unlocking button. The charger plug cannot be removed from a charging socket of a transportation vehicle without being unlocked. With a view to automating the charging procedure, it is therefore beneficial for the unlocking to be able to be performed by the gripper device so that no manual intervention is required.

According to at least one disclosed embodiment, the unlocking mechanism has a spring mechanism for activating the securing element. By using a spring mechanism, unlocking can be achieved without an additional actuator. The securing element is unlocked solely on account of the charger plug being received by the gripper device. Differences in terms of the height of the charger plugs herein can be compensated by the spring mechanism, and the securing element can always be reliably unlocked. When the gripper device is released from the charger plug once the charger plug has been plugged into a charging socket, the securing element is automatically locked again so that the charging procedure can be initiated.

According to at least one disclosed embodiment, the unlocking mechanism has an actuator for activating the securing element. In this exemplary embodiment, the unlocking mechanism is activated by an additional actuator. This solution is particularly beneficial when the activation of the securing element requires comparatively high forces.

According to at least one disclosed embodiment, the housing has a stationary post, the contour of the latter being adapted to a contour of a cavity of a handle region of the charger plug. This exemplary embodiment provides reduced complexity. The gripper device herein does not grip in the actual sense but is pushed onto the charger plug from below. This pure form-fit then does not permit any further relative movements between the gripper device and the charger plug other than in the plug-fitting direction. This is sufficient because the plug-fitting direction when connecting the charger plug to the transportation vehicle is not always identical to the direction in which the charger plug is connected to the gripper device.

According to at least one disclosed embodiment, the gripper device has a lever for activating a securing element of the charger plug. The lever herein may have a curvature which is adapted to a shape of the handle region. The lever is disposed on the gripper device such that the lever is automatically activated and unlocks the securing element when the charger plug is being pushed into the gripper device. The curvature of the lever improves the contact angle relative to a handle of the charger plug. The contact angle may be kept at approximately 45° in each position. This reduces friction, on the one hand, and moreover ensures that the range of movement of the lever is increased.

A disclosed gripper device is utilized by a charging robot for a transportation vehicle. Such a charging robot can be utilized, for example, for connecting AC and DC charger plugs in a robot-assistant manner to an electric transportation vehicle in an automated electric charging station, or in the production of electric transportation vehicles. The disclosed gripper device can likewise be utilized for gripping other objects having at least in part a uniformly shaped contour, for example, for a classic fuel hose with a handle.

For a better understanding of the principles of the disclosure, exemplary embodiments will be explained in more detail hereunder by the figures while using the example of a charger plug for a transportation vehicle. It is to be understood that the disclosure is not limited to these exemplary embodiments and that the features described can also be combined or modified without departing from the scope of protection of the disclosure as defined in the appended claims.

Figure 1A:
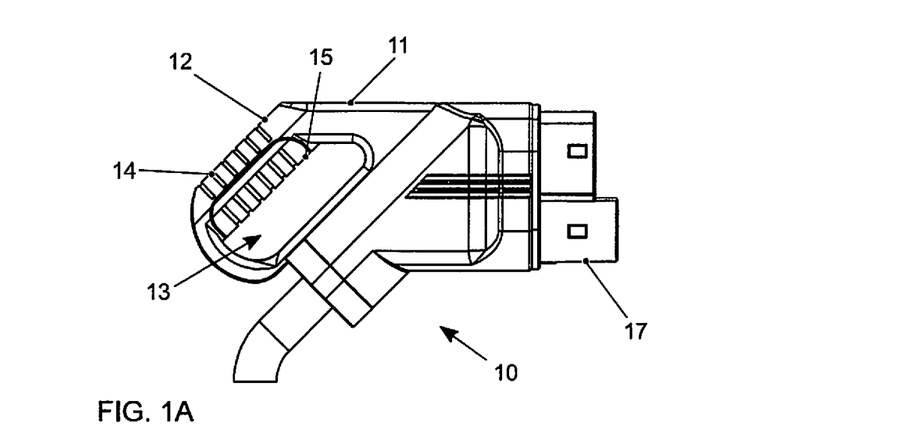
FIGS. 1A-C shows a first exemplary embodiment of a charger plug for a transportation vehicle as an example of an object to be gripped.
Figure 1B:
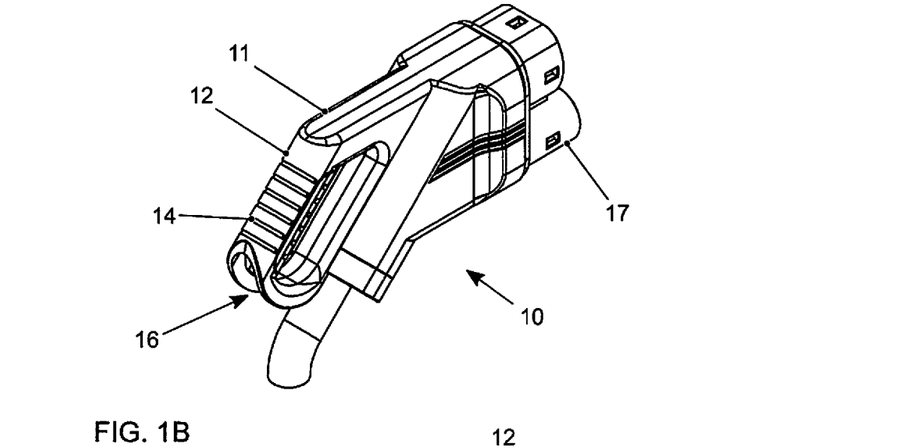
Figure 1C:
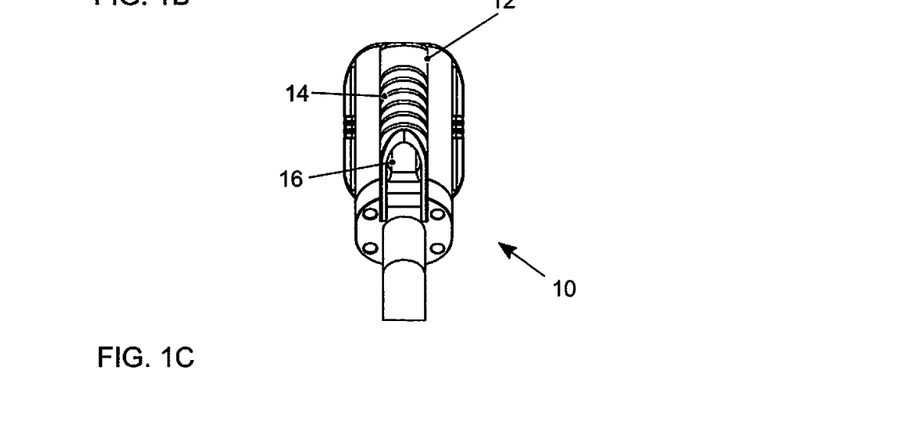

FIG. 1 shows a first exemplary embodiment of a charger plug 10 for a transportation vehicle as an example of an object to be gripped. Sub-image a) herein shows a lateral view, sub-image b) shows a view from obliquely above, and sub-image c) shows a rearview. The charger plug 10 illustrated by the PHOENIX CONTACT company has a handle 11 having a handle region 12. Since the charger plug 10 is provided for manual operation, the handle 11 has a handle recess 13 in which the user can engage using one hand. The handle region 12 has a pronounced handle contour 14 and a rounded shape such that the handle region 12 in a manner adjacent to the handle recess 13 has an internal radiused feature 15. The handle region 12 encloses a cavity 16 which is open toward the rear. Electrical plug contacts 17 which can be differently embodied depending on the type of the charging current and the region of use of the charger plug 10 are disposed at the front end of the charger plug 10. The disclosed embodiment of the handle region 12 is identical, independently of the exemplary embodiment of the electrical plug contacts 17.

Figure 2:
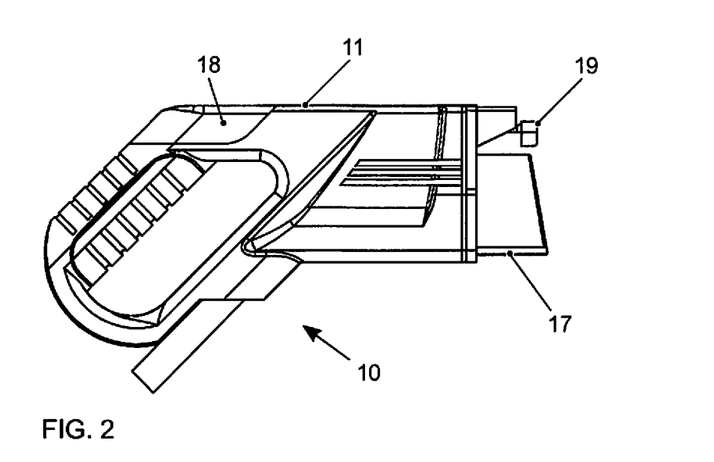
FIG. 2 shows a second exemplary embodiment of a charger plug for a transportation vehicle as an example of an object to be gripped.
Figure 3A:
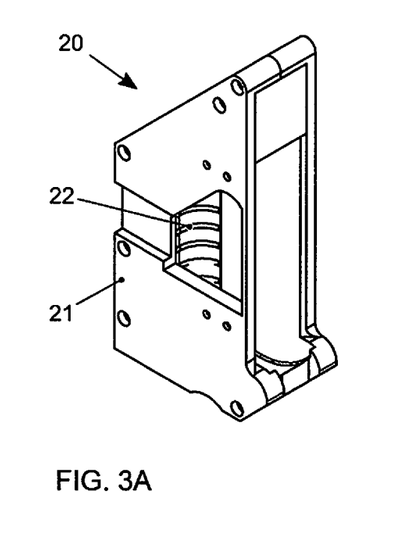
FIGS. 3A-D shows a first exemplary embodiment of a gripper device.
Figure 3B:
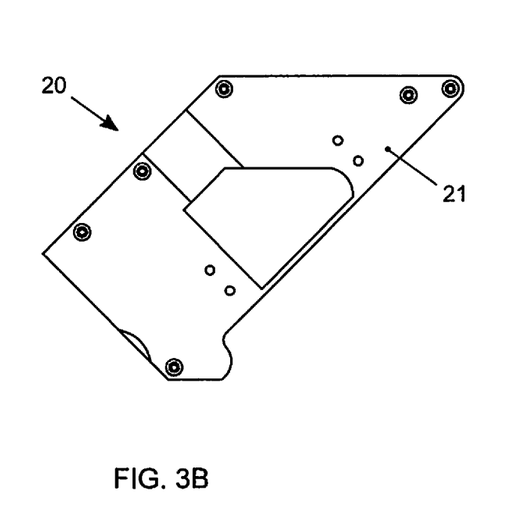
Figure 3C:
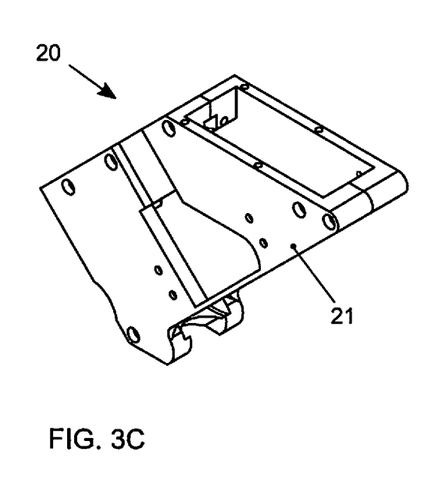
Figure 3D:
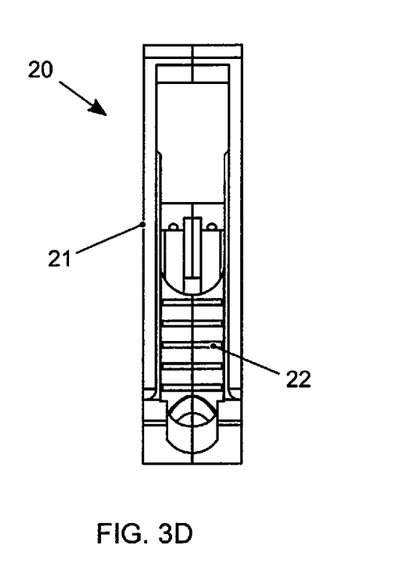

FIG. 2 shows a second exemplary embodiment of a charger plug 10 for a transportation vehicle as an example of an object to be gripped. Only a lateral view is illustrated. The handle 11 of the charger plug 10 in terms of construction is largely identical to the charger plug 10 from FIG. 1. However, the handle 11 in the upper region thereof has an unlocking button 18 for a securing element 19 of the charger plug 10. Moreover, the electrical plug contacts 17 as well as the housing of the charger plug 10 in the region of the electrical plug contacts 17 are of a deviating disclosed embodiment.

FIG. 3 shows a first exemplary embodiment of a gripper device 20 for the charger plugs from FIG. 1 and FIG. 2.

Sub-image a) herein shows a view from obliquely below, sub-image b) a lateral view, sub-image c) a view from obliquely above, and sub-image d) a view from below. In this disclosed embodiment the handle region of the charger plug is enclosed by the gripper device 20. The internal contour 22 of the housing 21 of the gripper device 20 is a negative impression of the handle contour of the charger plug. The housing 21 can be pushed onto the charger plug from the rear and latches on account of tilting. The internal contour 22 of the housing 21 and the handle contour of the charger plug engage in one another. The elasticity of the handle material in the handle region enables the latching as in a snap-fit mechanism. The pairing herein is mainly generated by a form-fit. This disclosed embodiment enables a passive basic design of the gripper device 20 and with the exception of the gripping robot does not require any further actuators. For fine adjustment the housing 21 can be made in two parts such that the fit can be set in an optimal manner by choosing the correct fitting shim.

Some exemplary embodiments are to be explained hereunder in relation to FIGS. 4 to 14.

Figure 4A:
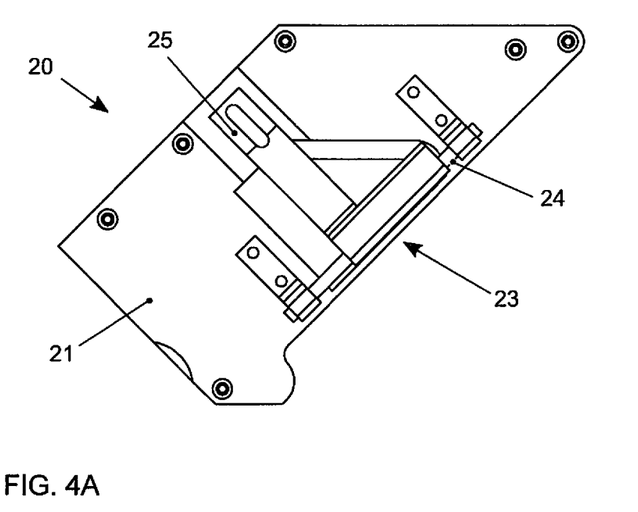
FIGS. 4A-B shows a second exemplary embodiment of a gripper device.
Figure 4B:
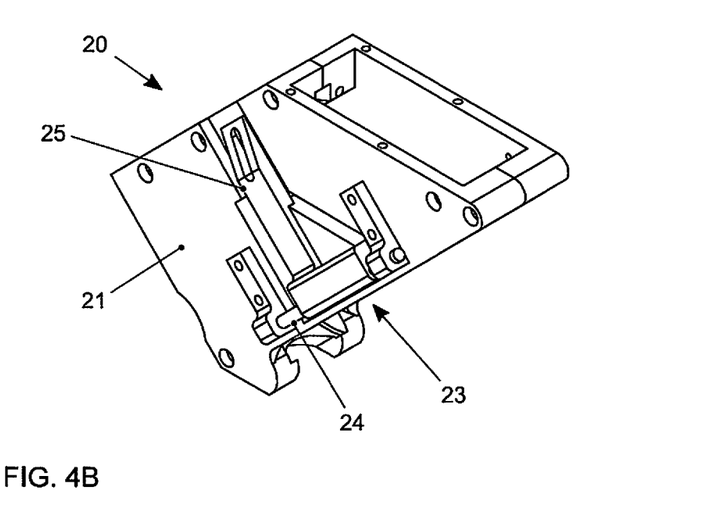

FIG. 4 shows a second exemplary embodiment of a gripper device 20 for the charger plugs from FIG. 1 and FIG. 2. Sub-image a) herein shows a lateral view, and sub-image b) a view from obliquely above. The gripper device 20 is largely identical to the gripper device 20 from FIG. 3. For the pairing reliability of the charger plug and the gripper device 20 to be enhanced, the gripper device 20 however has a passive locking mechanism 23. The locking mechanism 23 contains a locking bar 25 which is disposed on an axle 24. The locking bar 25 in the closed state engages in the handle recess of the charger plug and presses against the internal radiused feature of the handle region. The pressing action is generated by way of a helical spring (not shown) which is disposed on the axle 24 and pushes the locking bar 25 into the housing 21. The locking bar 25 can rotate about the axle 24 and fold outward when opening. For the charger plug to be able to be released, the latter has to be tilted out of the gripper device 20. To this end, the retaining force of the locking bar 25 has to be overcome. For the charger plug and the gripper device 20 to be connected, the gripper device 20 is pushed onto the handle of the charger plug from the rear. A contact face of the locking bar 25 is shaped so as to be oblique for the handle to readily slide into the housing 21.

Figure 5A:
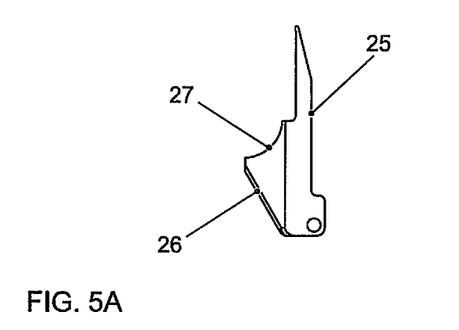
FIGS. 5A-C illustrates a locking bar of a locking mechanism of the gripper device of FIG. 4.
Figure 5B:
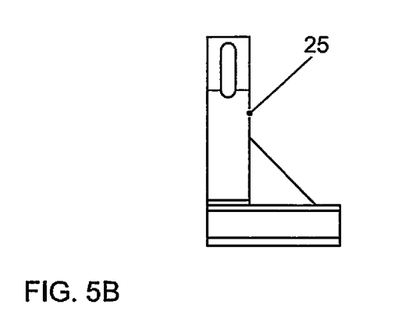
Figure 5C:
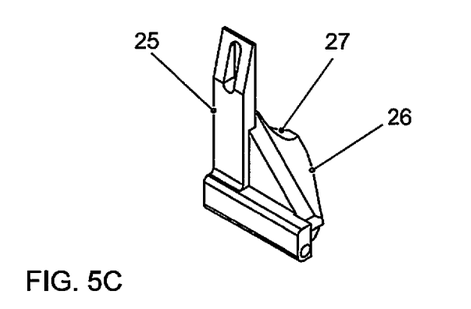

FIG. 5 illustrates the locking bar 25 of the locking mechanism of the gripper device from FIG. 4. Sub-image a) herein shows a view along the axle, sub-image b) a lateral view, and sub-image c) a view from obliquely above. A contact pressure element 26 which in the closed state presses against the internal radiused feature of the handle region of the charger plug can readily be seen in sub-image a) and sub-image c). An obliquely shaped contact face 27 of the contact pressure element 26 can likewise be readily seen, the contact face 27 ensuring that the handle can be readily pushed into the housing.

Figure 6A:
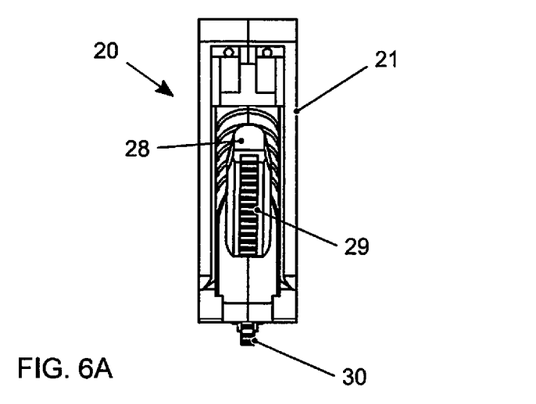
FIGS. 6A-C shows a third exemplary embodiment of a gripper device.
Figure 6B:
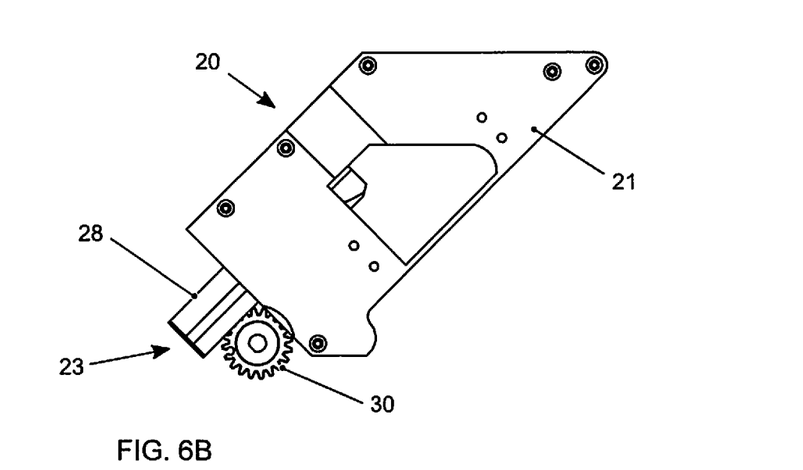
Figure 6C:
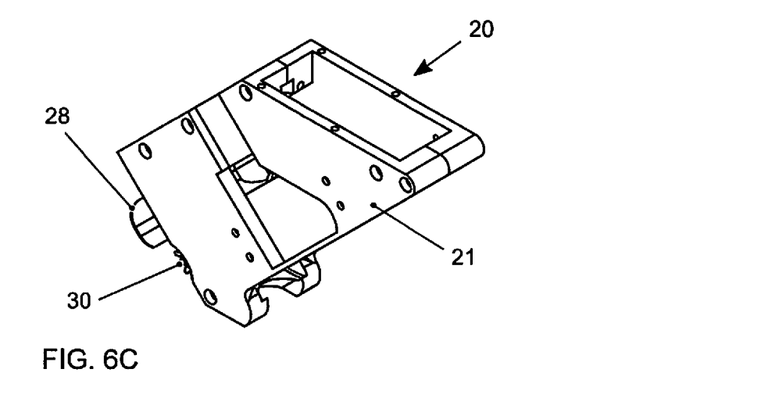

FIG. 6 shows a third exemplary embodiment of a gripper device 20 for the charger plugs from FIG. 1 and FIG. 2. Sub-image a) herein shows a view from below, sub-image b) a lateral view, and sub-image c) a view from obliquely above. In this disclosed embodiment an active locking mechanism 23 is utilized so that the charger plug can be released and connected without any effort in terms of force. There can be a slight amount of play between the housing 21 and the charger plug in this case. To be gripped, the housing 21 is pushed onto the handle of the charger plug from behind. The fixed pairing is achieved by a stud 28 which moves into the cavity of the handle from below. The stud 28 is mounted in the housing 21 and is movable in a linear manner by way of kinematics. In the example, the kinematics comprises a rack 29 which is integrated in the stud 28 and a driven gear wheel 30. Only very minor forces are used in moving the stud 28 since the retaining forces are not generated by the actuating elements but by way of the structure and mounting are directed directly into the housing 21. The actuating elements can thus be switched off in the secure state, i.e., when the stud 28 is moved into the cavity.

Figure 7A:
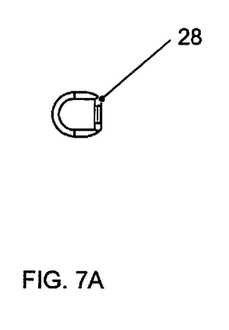
FIGS. 7A-C illustrates a stud of a locking mechanism of the gripper device of FIG. 6.
Figure 7B:
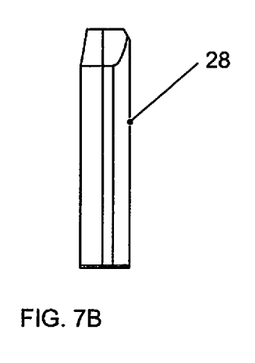
Figure 7C:
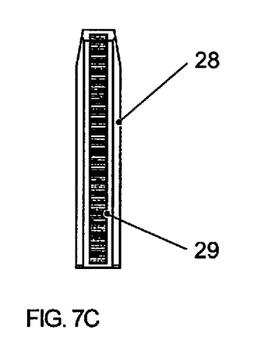

FIG. 7 illustrates the stud 28 of the locking mechanism of the gripper device from FIG. 6. Sub-image a) herein shows a front view, sub-image b) a lateral view, and sub-image c) a view from below. The rack 29 which is integrated in the lower side of the stud 28 and enables the stud 28 to be displaced in the gripper device by the driven gear wheel can be readily seen.

The charger plug from FIG. 2 has a securing element which has to be unlocked by activating the unlocking button. To this end, several locking mechanisms are to be presented. The unlocking mechanisms are compatible with all gripper devices described above.

Figure 8:
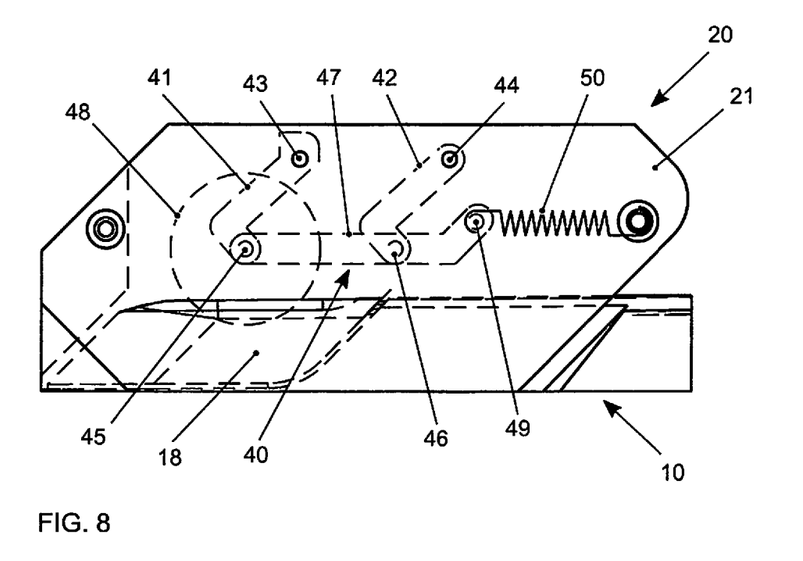
FIG. 8 shows a first example of an unlocking mechanism for a securing element of a charger plug.

FIG. 8 shows a first example of an unlocking mechanism 40 for a securing element of the charger plug 10. This exemplary embodiment of the locking mechanism 40 utilizes a spring-supported system which is integrated within the gripper device 20 and which can compensate differences in terms of the height of the charger plugs 10 so as to reliably unlock the securing elements of the charger plugs 10. The spring-supported system is composed of two legs 41, 42 which are aligned so as to be parallel, the upper ends of the legs 41, 42 being in each case connected to the housing 21 by way of axles 43, 44. The lower ends are in each case connected to a web 47 by way of axles 45, 46. The web 47 by way of the axle 45 and the legs 41 is moreover equipped with a wheel 48 which is situated vertically above the unlocking button 18. A further axle 49 which couples at tension spring 50 to the web 47 is situated at the right end of the web 47. The tension spring 50 at the other end is connected to the housing 21 of the gripper device 20. The direction of tension of the spring 50 allows the legs 41, 42 to rotate about the axles 43, 44 thereof such that the ends of the legs 41, 42 push the web 47 in the direction of the charger plug 10 and thus the wheel 48 onto the unlocking button 18.

Figure 9:
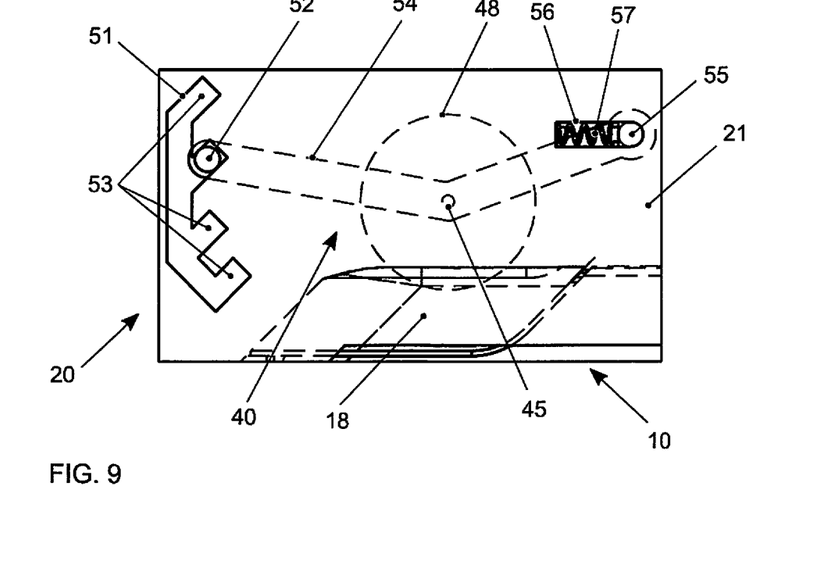
FIG. 9 shows a second example of an unlocking mechanism for a securing element of a charger plug.

FIG. 9 shows a second example of an unlocking mechanism 40 for a securing element of the charger plug 10. This exemplary embodiment of the locking mechanism 40 is embodied so as to be rigid, but the robot can configure the mechanism for the unlocking in a self-acting manner and thus set the mechanism for the unlocking to different charger plugs 10. The mechanism is composed of the contour 51 which is integrated in the wall of the housing 21 and serves as a guide for a pin 52 and possesses corresponding latching positions 53 for various charger plugs 10. The pin 52 is fastened to the left end of a swing arm 54 and protrudes out of the housing 21 so far that the robotic arm can move the latter with the aid of a counter bearing. A wheel 48 which is positioned so as to be centric above the unlocking button 18 of the charger plug 10 sits so as to be freely rotatable on an axle 45 in the center of the swing arm 54. A further pin 55 which is horizontally guided in a clearance 56 is integrated at the right end of the swing arm 54. This enables the horizontal movement of the left pin 52 in the contour 51. A compression spring 57 which fixes the swing arm 54 in one of the latching positions 53 is moreover integrated in the clearance 56 to prevent the pin 52 from unintentionally sliding out. In these latching positions 53, the spacing of the handle from the point of complete unlocking of the securing element is adapted to the respective charger plugs 10, on account of which the latter when gripped by the robot are automatically unlocked by permanent activation.

Figure 10:
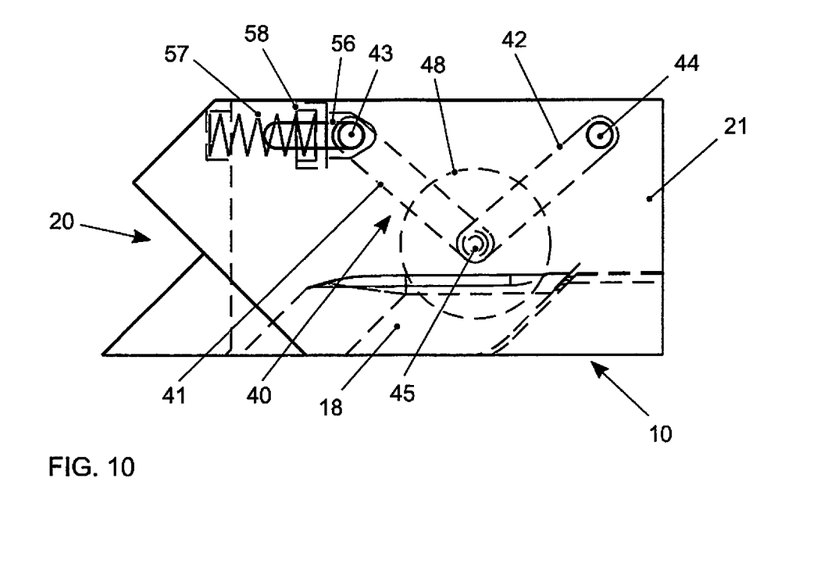
FIG. 10 shows a third example of an unlocking mechanism for a securing element of a charger plug.

FIG. 10 shows a third example of an unlocking mechanism 40 for a securing element of the charger plug 10. This exemplary embodiment of the unlocking mechanism 40 utilizes a spring-supported system which is integrated within the gripper device 20 and can compensate differences in terms of height of the charger plugs 10 so as to reliably unlock the securing elements of the charger plugs 10. The spring-supported system is composed of two legs 41, 42 which at the lower end are connected to one another by way of an axle 45. A wheel 48 is moreover mounted on this axle 45. The right leg 42 at the upper end is coupled to the housing 21 by way of a further axle 44. The left leg 42 at the upper end, by way of an axle 43, is connected to a spring bushing 58 in which the right end of a compression spring 57 lies. The axle 43 is moreover guided in the housing 21 by horizontal clearances 56. The spring 57, the other end thereof lying in the housing 21, pushes the upper end of the left leg 41 from the housing wall in the direction of the other leg 42. On account of this scissor movement, the lower axle 45 and thus the wheel 48 which lies above the unlocking button 18 are pushed onto the unlocking button 18, on account of which the latter is activated.

Figure 11A:
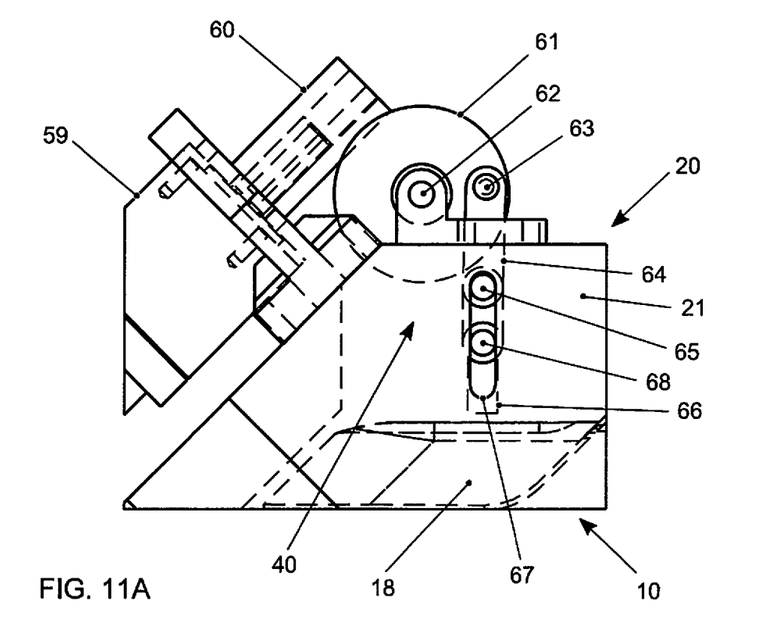
FIGS. 11A-B shows a fourth example of an unlocking mechanism for a securing element of a charger plug.
Figure 11B:
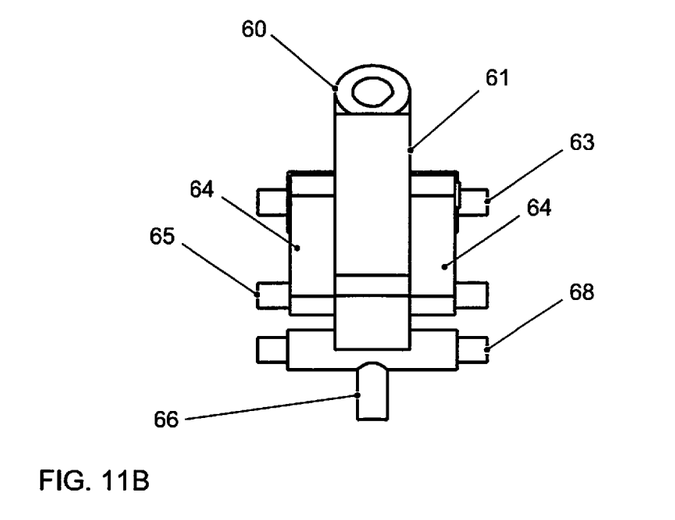

FIG. 11 shows a fourth example of an unlocking mechanism 40 for a securing element of the charger plug 10. This exemplary embodiment of the unlocking mechanism 40 utilizes an actuator 59, a worm gear 60 which drives a globoid wheel 61 sitting on the shaft of the actuator 59. This globoid wheel 61 is mounted on the housing 21 so as to freely rotate on an axle 62 and is laterally provided with a bore through which an axle 63 is plug-fitted. This axle 63 couples a pair of legs 64 at the upper ends thereof to the globoid wheel 61. The lower ends are coupled to a tappet 66 by way of a further axle 65. To guarantee vertical guiding, the tappet 66 conjointly with the axle 65 is guided in a vertical oblong hole 67 in the housing wall. To this end, the tappet 66 is shaped as an axle 68 which is parallel to the axle 65. When the globoid wheel 61 is operated by way of the actuating elements, the legs 64 convert the rotating movement to a linear movement. The latter moves the tappet 66 in the direction of the unlocking button 18 of the charger plug 10 and unlocks or locks, respectively, the securing element. Sub-image a) shows a lateral view, sub-image b) a front view onto the worm gear 60, the globoid wheel 61 and the tappet 66 including the axles 63, 65, 68 and the legs 64.

Figure 12:
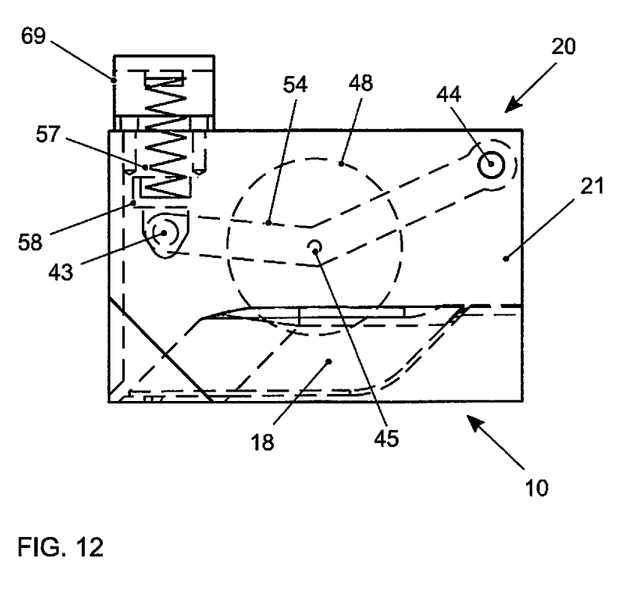
FIG. 12 shows a fifth example of an unlocking element for a securing element of a charger plug.
Figure 13A:
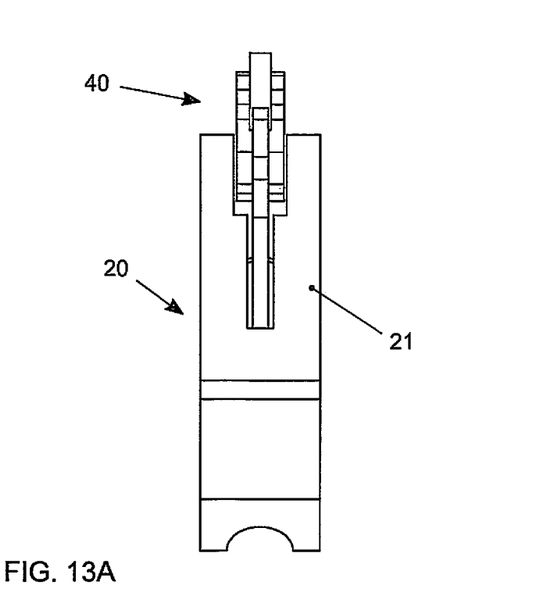
FIGS. 13A-D shows a fourth exemplary embodiment of a gripper device.
Figure 13B:
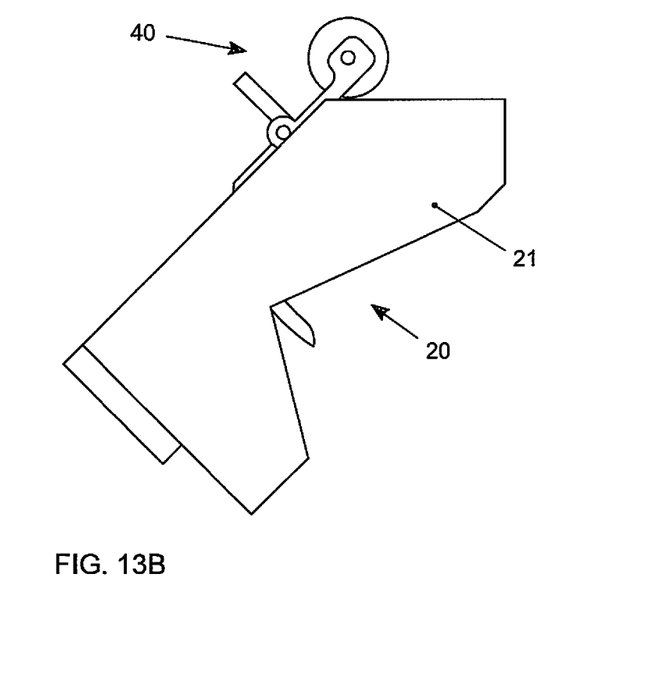
Figure 13C:
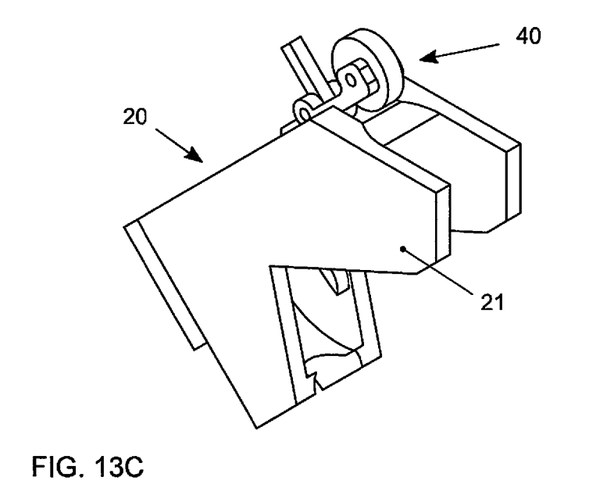
Figure 13D:
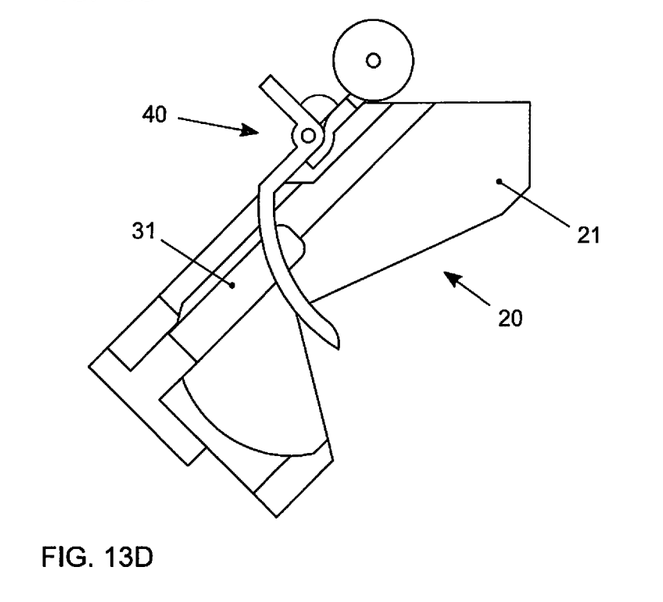

FIG. 12 shows a fifth example of an unlocking mechanism for a securing element of the charger plug 10. This exemplary embodiment of the unlocking mechanism 40 utilizes a spring-supported system which is integrated within the gripper device 20 and which can compensate differences in terms of the height of the charger plugs 10 so as to reliably unlock the securing elements of the charger plugs 10. The spring-supported system is composed of a swing arm 54 which at the right end by way of an axle 44 is coupled to the housing 21. A wheel 48 in the center of the swing arm 54 is mounted so as to freely rotate by way of an axle 45 above the unlocking button 18 of the charger plug. The other end of the swing arm by way of an axle 43 is connected to a short spring bushing 58 in which a vertically aligned compression spring 57 lies. The upper end of the spring 57 lies in a counter bearing 69 which is connected to the housing 21. The spring 57 by way of the spring bushing 58 pushes the swing arm 54 toward the charger plug 10 and thus pushes the wheel 48 against the unlocking button 18 of the charger plug 10, on account of which the unlocking button 18 is activated.

FIG. 13 shows a fourth exemplary embodiment of a gripper device 20 for the charger plugs from FIG. 1 and FIG. 2. This fourth disclosed embodiment utilizes another gripper mechanism. Sub-image a) shows a view from above, sub-image b) a lateral view, sub-image c) a view from obliquely above, and sub-image d) a section through the gripper device 20. The complexity can be further reduced in that the gripper device 20 does not grip in the actual sense but is plug-fitted. The housing 21 as a negative contour is adapted to the lower part of the charger plug. The housing 21 in the interior possesses a stationary post 31 which is adapted to the internal contour of the cavity of the handle region. The gripper device 20 can therefore be pushed onto the charger plug from below. This pure form-fit then does not permit any further relative movements between the gripper device 20 and the charger plug 10 other than in the plug-fitting direction. This is sufficient because the plug-fitting direction when connecting the charger plug to the transportation vehicle is not always identical to the direction in which the charger plug is connected to the gripper device 20. The position of the stationary post 31 may be set so as to achieve optimal play between the gripper device 20 and the charger plug. The gripper device 20 has an unlocking mechanism 40, the functional mode thereof being described hereunder.

Figure 14:
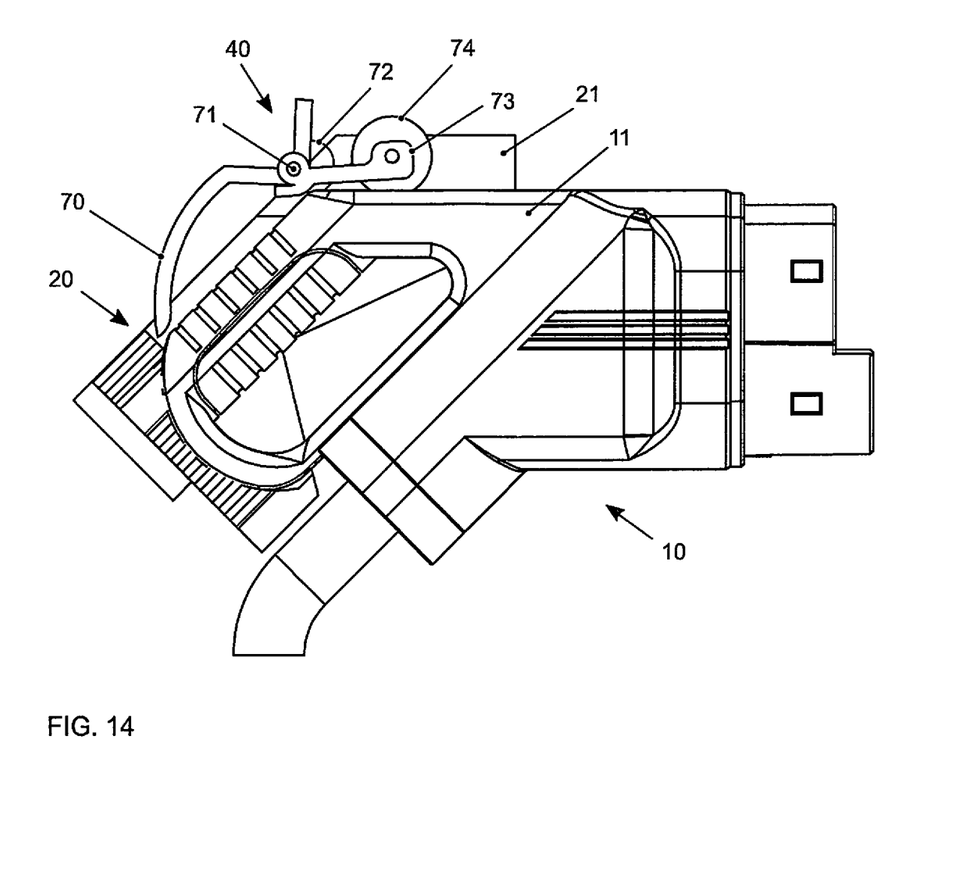
FIG. 14 illustrates an unlocking mechanism of the gripper device of FIG. 13.

FIG. 14 illustrates the functional mode of the unlocking mechanism 40 of the gripper device 20 from FIG. 13, the unlocking device 40 utilizing a modified unlocking concept. When the charger plug 10 is pushed into the gripper device 20, the charger plug 10 thus activates a lever 70 which by way of an axle 71 is coupled to the housing 21. The curvature of the lever 70 improves the contact angle relative to the handle 11, the contact angle optionally being kept at approximately 45° in each position. This reduces friction, on the one hand, and moreover ensures that the range of movement of the lever 70 is increased. An increased rotation about the axle 71 is thus achieved. The lever 70 by way of a spring 72 is connected to a mounting 73 of a wheel 74. As soon as the lever 70 is pushed out of the housing 21 by the charger plug 10, the lever 70 tensions the spring 72 and the wheel 74 attempts to fold inward. However, the wheel 74 is stopped by the handle 11 of the charger plug 10. The wheel 74 can fold inward only once the charger plug 10 has been completely pushed into the housing 21. The wheel 74 in the folded-in-state pushes onto the unlocking button of the charger plug 10, and the securing element is unlocked. This mechanism herein not only activates the unlocking button but simultaneously fixes the charger plug 10 in the housing 21. For opening, the spring 72 has to be overcome for the wheel 74 to slide out of the housing 21.

LIST OF REFERENCE SIGNS

10 Charger plug
11 Handle
12 Handle region
13 Handle recess
14 Handle contour
15 Internal radiused feature
16 Cavity
17 Electrical plug contacts
18 Unlocking button
19 Securing element
20 Gripper device
21 Housing
22 Internal contour 23 Locking mechanism
24 Axle
25 Locking bar
26 Contact pressure element
27 Contact face
28 Stud
29 Rack
30 Gear wheel
31 Post
40 Unlocking mechanism
41, 42 Leg
43-46 Axle
47 Web
48 Wheel
49 Axle
50 Tension spring

The invention claimed is:

1. A gripper device for gripping a charger plug for charging a transportation vehicle, the gripper device comprising:
    a housing including an internal contour that is a negative contour adapted to a contour of a handle region of the charger plug; and
    a lever for activating a securing element of the charger plug,
    wherein the housing is configured to be pushed onto the charger plug and snapped into place by tilting whereby the internal contour of the housing engages with the contour of the charger plug handle region, and
    wherein the lever is disposed on the gripper device such that the lever is automatically activated and unlocks the securing element as a result of the gripper housing being pushed onto the charger plug.

2. The gripper device of claim 1, the gripper device further comprising a locking mechanism which fixes the charger plug in the housing.

3. The gripper device of claim 2, wherein the locking mechanism engages in a handle recess of the charger plug.

4. The gripper device of claim 2, wherein the locking mechanism comprises an adjustable stud for introduction into a cavity of the handle region.

5. The gripper device of claim 1, wherein the gripper device comprises an unlocking mechanism for a securing element of the charger plug.

6. The gripper device of claim 5, wherein the unlocking mechanism comprises a spring mechanism for activating the securing element.

7. The gripper device of claim 5, wherein the unlocking mechanism comprises an actuator for activating the securing element.

8. The gripper device of claim 1, wherein the housing comprises a stationary post, wherein the contour of the stationary post is adapted to a contour of a cavity of a handle region of the charger plug.

9. The gripper device of claim 1, wherein the lever has a curvature adapted to a shape of the handle region.

10. A charging robot for a transportation vehicle, wherein the charging robot comprises the gripper device of claim 1.

11. The charging robot of claim 10, wherein the internal contour of the housing is adapted to a contour of a handle region of the charger plug.

12. The charging robot of claim 10, wherein the gripper device has a locking mechanism which fixes the charger plug in the housing.

13. The charging robot of claim 12, wherein the locking mechanism engages in a handle recess of the charger plug.

14. The charging robot of claim 12, wherein the locking mechanism has an adjustable stud for introduction into a cavity of the handle region.

15. The charging robot of claim 10, wherein the gripper device has an unlocking mechanism for a securing element of the charger plug.

16. The charging robot of claim 15, wherein the unlocking mechanism has a spring mechanism for activating the securing element.

17. The charging robot of claim 15, wherein the unlocking mechanism has an actuator for activating the securing element.

18. The charging robot of claim 10, wherein the housing has a stationary post, wherein the contour of the stationary post is adapted to a contour of a cavity of a handle region of the charger plug.

19. The charging robot of claim 18, wherein the gripper device has a lever for activating a securing element of the charger plug.

20. The charging robot of claim 19, wherein the lever has a curvature adapted to a shape of the handle region.

* * * * *